C. J. BEAVER & E. A. CLAREMONT.
ELECTRIC CONDUCTOR.
APPLICATION FILED JULY 19, 1915.
1,256,863.
Patented Feb. 19, 1918.
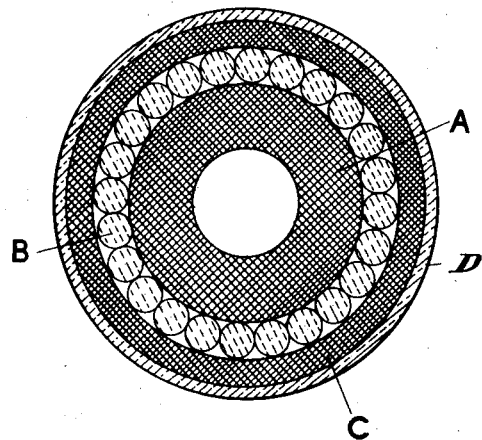
Witnesses:
Inventors:
Charles James Beaver
Ernest Alexander Claremont.
by their Attorney

UNITED STATES PATENT OFFICE.

CHARLES JAMES BEAVER, OF HALE, AND ERNEST ALEXANDER CLAREMONT, OF HIGH LEIGH, ENGLAND.

ELECTRIC CONDUCTOR.

1,256,863.   Specification of Letters Patent.   Patented Feb. 19, 1918.

Application filed July 19, 1915. Serial No. 40,684.

*To all whom it may concern:*

Be it known that we, CHARLES JAMES BEAVER and ERNEST ALEXANDER CLAREMONT, both subjects of the King of England, and residing at Hale and High Leigh, in Cheshire, respectively, in England, have invented a certain new and useful Improved Electric Conductor, of which the following is a specification.

Our invention has reference to high voltage insulated electric cables where it is desirable to increase the radius and hence the cross sectional area of the conductor beyond that necessary to attain the desired current carrying capacity in order to minimize the stress on the insulation in the neighborhood of the conductor and thus reduce the otherwise necessary thickness of the insulation, and our invention has for its object to save the waste of copper involved in enlarging the cross sectional area of the cable and at the same time to secure, on one hand the necessary flexibility, and on the other hand security from distortion necessary in a high voltage cable.

In such a cable intended for high voltage currents it is of great importance that while securing sufficient flexibility for practical purposes, the conductor shall not be capable of being readily distorted from its circular shape or other normal cross section.

The accompanying drawing is a cross section of a cable constructed according to this invention.

The conductor (of which there may be more than one) in our cable consists of a hollow core A in the nature of a tube made of lead or other suitable metal, surrounded by strands of metal, such as copper B laid on said core helically and a thin lead tube C on the outside of said copper strands. The conductor is insulated with insulating material D of any suitable kind and according to any suitable method now in use.

In the construction of a conductor according to our invention we by preference proceed as follows. We make the lead tube A and lay or strand upon it spirally by an ordinary stranding or wire braiding machine a suitable number of the metal wires B. We then, by passing the wire covered lead tube through a lead press in well known manner, form on the outside of the same the other lead tube C so that the layer or layers of metal strands are held within the annular space between the two lead tubes A and C.

We may use in place of the lead some other suitable metal or alloy, such as lead antimony alloy but we prefer to use lead and we may use any suitable metal for the strands of the conductor but we prefer to use copper.

A cable so constructed enables the saving of copper to be effected and at the same time on the one hand secures sufficient flexibility and on the other prevents any undue distortion of the copper strands and consequent local disturbance of the electrical stress in the insulation.

What we claim as our invention and desire to secure by Letters Patent of the United States is:—

1. A conductor for an electric cable comprising an inner metal core, bare metal conductor wires uninsulated from each other and surrounding said core, an outer metal tube inclosing said core and conductor wires, and insulation covering said outer tube, said core and tube being in substantial linear metallic contact with each conductor wire and forming guides for the wires which will permit and control the movements of said wires in relation to each other and to said core and tube to insure a smooth surface of the conductor being presented to the insulation upon distortion of the cable.

2. A conductor for an electric cable comprising an inner hollow metal core, bare metal conductor wires uninsulated from each other and surrounding said core, an outer metal tube inclosing said core and conductor wires, and insulation covering said outer tube, said core and tube being in substantial linear metallic contact with said conductor wires and forming guides for the wires which will permit and control the movements of said wires in relation to each other and to said core and tube to insure a smooth surface of the conductor being presented to the insulation upon distortiton of the cable.

3. A conductor for an electric cable comprising an inner metal core, bare metal conductor wires uninsulated from each other and helically wound about said core, an outer lead tube inclosing the core and conductor wires, and insulation covering said outer tube, said core and tube being in substantial linear metallic contact with said conductor wires themselves and forming guides for the wires which permit and control the movements of said wires in relation to each other and to said core and tube to insure a smooth surface of the conductor being presented to the insulation upon distortion of the cable.

4. A conductor for an electric cable comprising an inner hollow metal core, bare metal conductor wires uninsulated from each other and helically wound about said core, an outer lead tube inclosing the core and conductor wires, and insulation covering said outer tube, said core and tube being in substantial linear metallic contact with said conductor wires themselves and forming guides for the wires which permit and control the movements of said wires in relation to each other and to said core and tube to insure a smooth surface of the conductor being presented to the insulation upon distortion of the cable.

5. A conductor for an electric cable comprising an inner metal core, bare metal conductor wires uninsulated from each other and helically wound about said core, an outer lead tube of less thickness than said core and inclosing the core and conductor wires, and insulation covering said outer tube, said core and tube being in substantial linear metallic contact with said conductor wires themselves and forming guides for the wires which permit and control the movements of said wires in relation to each other and to said core and tube to insure a smooth surface of the conductor being presented to the insulation upon distortion of the cable.

6. A conductor for an electric cable comprising an inner hollow metal core, bare metal conductor wires uninsulated from each other and helically wound about said core, an outer lead tube of less thickness than said core and inclosing the core and conductor wires, and insulation covering said outer tube, said core and tube being in substantial linear metallic contact with said conductor wires themselves and forming guides for the wires which permit and control the movements of said wires in relation to each other and to said core and tube to insure a smooth surface of the conductor being presented to the insulation upon distortion of the cable.

7. An electric cable comprising in combination a conductor consisting of an inner metal core, bare metal conductor wires uninsulated from each other and surrounding said core, an outer metal tube inclosing said core and conductor wires, and insulation inclosing said conductor, said core and tube being in substantial linear metallic contact with said conductor wires and forming guides therefor which permit and control the movements of said wires in relation to each other and to said core and tube to insure a smooth surface of the conductor being presented to said insulation upon distortion of the cable.

8. An electric cable comprising in combination a conductor consisting of an inner hollow metal core, bare metal conductor wires uninsulated from each other and surrounding said core, an outer metal tube inclosing said core and conductor wires, and insulation inclosing said conductor, said core and tube being in substantial linear metallic contact with said conductor wires and forming guides therefor which permit and control the movements of said wires in relation to each other and to said core and tube to insure a smooth surface of the conductor being presented to said insulation upon distortion of the cable.

9. An electric cable comprising in combination a conductor consisting of an inner metal core, bare metal conductor wires uninsulated from each other and surrounding said core, an outer lead tube inclosing said core and conductor wires, and insulation inclosing said conductor, said core and tube being in substantial linear metallic contact with said conductor wires and forming guides therefor which permit and control the movements of said wires in relation to each other and to said core and tube to insure a smooth surface of the conductor being presented to said insulation upon distortion of the cable.

10. An electric cable comprising in combination a conductor consisting of an inner metal core, bare metal conductor wires uninsulated from each other and surrounding said core, an outer lead tube of less thickness than said core and inclosing said core and conductor wires, and insulation inclosing said conductor, said core and tube being in substantial linear metallic contact with said conductor wires and forming guides therefor which permit and control the movements of said wires in relation to each other and to said core and tube to insure a smooth surface of the conductor being presented to said insulation upon distortion of the cable.

In witness whereof we have signed this specification in the presence of two witnesses.

CHARLES JAMES BEAVER.
ERNEST ALEXANDER CLAREMONT.

Witnesses:
ERNALD SIMPSON MOSELEY,
MALCOLM SMETHURST.